(12) United States Patent
Park et al.

(10) Patent No.: US 12,066,685 B2
(45) Date of Patent: *Aug. 20, 2024

(54) MOTOR FOR DRIVING LENSES

(71) Applicant: LG INNOTEK CO., LTD., Seoul (KR)

(72) Inventors: Sang Ok Park, Seoul (KR); Sang Hee Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,581

(22) Filed: May 30, 2023

(65) Prior Publication Data

US 2023/0305264 A1    Sep. 28, 2023

Related U.S. Application Data

(63) Continuation of application No. 17/811,722, filed on Jul. 11, 2022, now Pat. No. 11,698,508, which is a
(Continued)

(30) Foreign Application Priority Data

May 11, 2006 (KR) .......................... 10-2006-0042643
May 12, 2006 (KR) .......................... 10-2006-0043024
May 17, 2006 (KR) .......................... 10-2006-0044203

(51) Int. Cl.
*G02B 7/02*      (2021.01)
*G02B 7/04*      (2021.01)
(Continued)

(52) U.S. Cl.
CPC ............. *G02B 7/023* (2013.01); *G02B 7/026* (2013.01); *G02B 7/04* (2013.01); *G02B 7/08* (2013.01);
(Continued)

(58) Field of Classification Search
CPC ..... G02B 7/023; G02B 7/026; H02K 41/0356
(Continued)

(56) References Cited

U.S. PATENT DOCUMENTS 4,669,823 A    6/1987  Iguma et al.
4,702,555 A   10/1987  Iguma et al.
(Continued)

FOREIGN PATENT DOCUMENTS

CN    1243963 A    2/2000
CN    1601316 A    3/2005
(Continued)

OTHER PUBLICATIONS

European Search Report dated Feb. 7, 2013 in European Application No. 12196142.9.
(Continued)

*Primary Examiner* — Zachary W Wilkes
(74) *Attorney, Agent, or Firm* — Saliwanchik, Lloyd & Eisenschenk

(57) ABSTRACT

A motor for driving lenses is provided. The motor includes a case, a yoke fixed in the case, a magnet fixed in the yoke, a carrier equipped with lenses and installed in the magnet such that the carrier moves up and down within the magnet, a coil coupled with the carrier, in which the coil cooperates with the magnet to move up and down the carrier, a spring unit including first and second springs having arc shapes and being separated from each other while forming a ring shape as a whole, a spacer supporting the outer peripheral surface of the spring unit, and a terminal provided on the spacer.

20 Claims, 11 Drawing Sheets

Related U.S. Application Data continuation of application No. 16/921,294, filed on Jul. 6, 2020, now Pat. No. 11,415,772, which is a continuation of application No. 15/868,606, filed on Jan. 11, 2018, now Pat. No. 10,746,953, which is a continuation of application No. 14/472,111, filed on Aug. 28, 2014, now Pat. No. 9,891,403, which is a continuation of application No. 13/954,535, filed on Jul. 30, 2013, now Pat. No. 8,922,919, which is a continuation of application No. 13/274,979, filed on Oct. 17, 2011, now Pat. No. 8,659,844, which is a continuation of application No. 11/913,307, filed as application No. PCT/KR2007/002322 on May 10, 2007, now Pat. No. 8,068,295.

(51) Int. Cl.
| | |
|---|---|
| *G02B 7/08* | (2021.01) |
| *G03B 3/10* | (2021.01) |
| *H02K 5/00* | (2006.01) |
| *H02K 5/22* | (2006.01) |
| *H02K 41/035* | (2006.01) |

(52) U.S. Cl.
CPC ................. *G03B 3/10* (2013.01); *H02K 5/00* (2013.01); *H02K 5/225* (2013.01); *H02K 41/0356* (2013.01); *H02K 2211/03* (2013.01)

(58) Field of Classification Search
USPC ........................................................ 359/824
See application file for complete search history.

(56) References Cited

U.S. PATENT DOCUMENTS

| | | | |
|---|---|---|---|
| 5,018,836 A | 5/1991 | Noda et al. | |
| 5,627,687 A | 5/1997 | Fujisawa | |
| 6,208,809 B1 | 3/2001 | Kanai et al. | |
| 6,616,480 B2 | 9/2003 | Kameyama | |
| 7,146,097 B2 | 12/2006 | Kameyama | |
| 7,158,316 B2 | 1/2007 | Chang | |
| 7,227,285 B2 | 6/2007 | Osaka | |
| 7,239,461 B2 | 7/2007 | Yabe | |
| 7,271,511 B2 | 9/2007 | Osaka | |
| 7,298,562 B2 | 11/2007 | Sue | |
| 7,400,463 B1 | 7/2008 | Wu | |
| 7,433,136 B2 | 10/2008 | Ichikawa | |
| 7,641,403 B2 | 1/2010 | Ishizawa | |
| 7,649,703 B2 | 1/2010 | Shiraki | |
| 7,663,818 B2 | 2/2010 | Chung | |
| 7,663,823 B2 | 2/2010 | Chung | |
| 7,706,088 B2 | 4/2010 | Chung | |
| 7,932,648 B2 | 4/2011 | Jung | |
| 8,040,621 B2 | 10/2011 | Chang | |
| 8,068,295 B2 | 11/2011 | Park | |
| 8,659,844 B2 | 2/2014 | Park | |
| 8,922,919 B2 | 12/2014 | Park et al. | |
| 9,891,403 B2 | 2/2018 | Park et al. | |
| 10,746,953 B2 | 8/2020 | Park et al. | |
| 11,415,772 B2 | 8/2022 | Park et al. | |
| 11,698,508 B2 * | 7/2023 | Park | G02B 7/04 359/824 |
| 2006/0028320 A1 | 2/2006 | Osaka | |
| 2006/0181632 A1 | 8/2006 | Makii et al. | |
| 2006/0202566 A1 | 9/2006 | Osaka | |

FOREIGN PATENT DOCUMENTS

| | | |
|---|---|---|
| CN | 1645235 A | 7/2005 |
| EP | 1560066 B1 | 3/2008 |
| JP | 2003-207708 A | 7/2003 |
| JP | 2003-295033 A | 10/2003 |
| JP | 2004-138992 A | 5/2004 |
| JP | 2004-197073 A | 7/2004 |
| JP | 2004-343895 A | 12/2004 |
| JP | 2005-037971 A | 2/2005 |
| JP | 2005-128405 | 5/2005 |
| JP | 2005-173431 A | 6/2005 |
| JP | 2005-258355 A | 9/2005 |
| JP | 2006-058662 A | 3/2006 |
| JP | 2006-227102 A | 8/2006 |
| JP | 2006-251216 A | 9/2006 |
| JP | 2008-033252 | 2/2008 |
| KR | 10-2000-0011798 A | 2/2000 |
| KR | 10-0490253 A | 5/2005 |
| KR | 10-2005-0076563 A | 7/2005 |
| KR | 10-2007-0109547 A | 11/2007 |
| KR | 10-2007-0109689 A | 11/2007 |
| KR | 10-2007-0111171 A | 11/2007 |
| TW | I253517 B | 4/2006 |
| WO | 2005/084013 A1 | 9/2005 |
| WO | 2006-085714 A1 | 8/2006 |

OTHER PUBLICATIONS

Certificate of Registration dated Jul. 20, 2011 in Chinese Patent No. 200780000505.6, filed May 10, 2007.
Notice of Allowance dated Apr. 2, 2013 in Taiwanese Application No. 096116954.
Office Action dated Oct. 18, 2013 in U.S. Appl. No. 13/954,535, filed Jul. 30, 2013.
European Search Report dated Apr. 3, 2020 in European Application No. 19189789.1.

\* cited by examiner

MOTOR FOR DRIVING LENSES

CROSS-REFERENCE TO RELATED APPLICATIONS

This application is a continuation of U.S. application Ser. No. 17/811,722, filed Jul. 11, 2022; which is a continuation of U.S. application Ser. No. 16/921,294, filed Jul. 6, 2020, now U.S. Pat. No. 11,415,772, issued Aug. 16, 2022; which is a continuation of U.S. application Ser. No. 15/868,606, filed Jan. 11, 2018, now U.S. Pat. No. 10,746,953, issued Aug. 18, 2020; which is a continuation of U.S. application Ser. No. 14/472,111, filed Aug. 28, 2014, now U.S. Pat. No. 9,891,403, issued Feb. 13, 2018; which is a continuation of U.S. application Ser. No. 13/954,535, filed Jul. 30, 2013, now U.S. Pat. No. 8,922,919, issued Dec. 30, 2014; which is a continuation of U.S. application Ser. No. 13/274,979, filed Oct. 17, 2011, now U.S. Pat. No. 8,659,844, issued Feb. 25, 2014; which is a continuation of U.S. application Ser. No. 11/913,307, filed Oct. 31, 2007, now U.S. Pat. No. 8,068,295, issued Nov. 29, 2011; which is the U.S. national stage application of International Patent Application No. PCT/KR2007/002322, filed May 10, 2007; which claims priority to Korean Patent Application Nos. 10-2006-0042643, 10-2006-0043024, and 10-2006-0044203; filed May 11, 2006, May 12, 2006, and May 17, 2006, respectively, all of which are incorporated herein by reference in their entirety.

BACKGROUND

Technical Field

The present document relates to a motor for driving lenses.

Background Art

As digital appliances have been diversified, digital devices equipped with cameras or MP3 players are developed and extensively used. In addition, a motor for driving lenses of the camera installed in the digital device is also developed and extensively used.

The motor for driving the lenses adjusts the position of the lenses by using a carrier that moves as current is supplied to/removed from a coil. The coil receives external power through a spring electrically connected to both the coil and a main printed circuit board (PCB).

Recently, many users request for small-sized digital appliances. In this regard, studies are being pursued to provide digital appliances having small size and capable of stably supplying current to the coil.

BRIEF SUMMARY

Technical Problem

Embodiments of the present invention provide a motor for driving lenses, capable of minimizing the size thereof while stably supplying current to a coil.

Technical Solution

An embodiment of the present invention provides a motor for driving lenses. The motor for driving lenses comprises a case, a yoke fixed in the case, a magnet fixed in the yoke, a carrier equipped with lenses and installed in the magnet such that the carrier moves up and down within the magnet, a coil coupled with the carrier, in which the coil cooperates with the magnet to move up and down the carrier, a spring unit including first and second springs having arc shapes and being separated from each other while forming a ring shape as a whole, in which an outer peripheral surface of the spring unit is fixed to the case, an inner peripheral surface of the spring unit is fixed to the carrier to elastically support the carrier, and a lead wire of the coil is connected to the spring unit so that external power is supplied to the coil, a spacer supporting the outer peripheral surface of the spring unit, and a terminal provided on the spacer, in which one side of the terminal protrudes downward by passing through a bottom of the case to make connection with the spring unit and a main PCB of a product.

An embodiment of the present invention provides a motor for driving lenses. The motor for driving lenses comprises a case, a yoke fixed in the case, a magnet fixed in the yoke, a carrier equipped with lenses and installed in the magnet such that the carrier moves up and down within the magnet, a coil coupled with the carrier, in which the coil cooperates with the magnet to move up and down the carrier, and a spring unit including first and second springs having arc shapes and being separated from each other while forming a ring shape as a whole, in which an outer peripheral surface of the spring unit is fixed to the case, an inner peripheral surface of the spring unit is fixed to the carrier to elastically support the carrier, and a lead wire of the coil is connected to the spring unit so that external power is supplied to the coil, wherein each of the first and second springs comprises an inner section integrally formed with the carrier, an outer section fixed to the case, and a connection section connecting the inner section to the outer section, a first end portion of the outer section is exposed out of the carrier and bent so as to be connected to a main PCB of a product by passing through the case, and a first end portion of the inner section is exposed out of the carrier such that the lead wire of the coil is connected to the first end portion of the inner section.

An embodiment of the present invention provides a motor for driving lenses. The motor for driving lenses comprises a case, a yoke fixed in the case, a magnet fixed in the yoke, a carrier equipped with lenses and installed in the magnet such that the carrier moves up and down within the magnet, a coil coupled with the carrier, in which the coil cooperates with the magnet to move up and down the carrier, and a spring unit including first and second springs having arc shapes and being separated from each other while forming a ring shape as a whole, in which an outer peripheral surface of the spring unit is fixed to the case, an inner peripheral surface of the spring unit is fixed to the carrier to elastically support the carrier, and a lead wire of the coil is connected to the spring unit so that external power is supplied to the coil, wherein each of the first and second springs comprises an inner section integrally formed with the carrier, an outer section fixed to the case, and a connection section connecting the inner section to the outer section, a first end portion of the outer section is exposed out of the carrier and bent so as to be connected to a main PCB of a product by passing through the case, and a second end portion of the inner section, which corresponds to a second end portion of the outer section opposite to the bending portion, is exposed out of the carrier such that the lead wire of the coil is connected to the second end portion of the inner section.

An embodiment of the present invention provides a motor for driving lenses. The motor for driving lenses comprises a case, a yoke fixed in the case, a magnet fixed in the yoke, a carrier equipped with lenses and installed in the magnet such that the carrier moves up and down within the magnet, a coil coupled with the carrier, in which the coil cooperates with the magnet to move up and down the carrier, and a spring unit including first and second springs having arc shapes and being separated from each other while forming a ring shape as a whole, in which an outer peripheral surface of the spring unit is fixed to the case, an inner peripheral surface of the spring unit is fixed to the carrier to elastically support the carrier, and a lead wire of the coil is connected to the spring unit so that external power is supplied to the coil, wherein each of the first and second springs comprises an inner section integrally formed with the carrier, an outer section fixed to the case, and a connection section connecting the inner section to the outer section, a first end portion of the inner section is exposed out of the carrier and bent so as to be connected to a main PCB of a product by passing through the case, and a second end portion of the inner section, which is opposite to the bending portion, is exposed out of the carrier such that the lead wire of the coil is connected to the second end portion of the inner section.

An embodiment of the present invention provides a motor for driving lenses. The motor for driving lenses comprises a case, a yoke fixed in the case, a magnet fixed in the yoke, a carrier equipped with lenses and installed in the magnet such that the carrier moves up and down within the magnet, a coil coupled with the carrier, in which the coil cooperates with the magnet to move up and down the carrier, a spring unit including first and second springs having arc shapes and being separated from each other while forming a ring shape as a whole, in which an outer peripheral surface of the spring unit is fixed to the case, an inner peripheral surface of the spring unit is fixed to the carrier to elastically support the carrier, and a lead wire of the coil is connected to the spring unit so that external power is supplied to the coil, and a connection member provided on the spring unit so as to support the lead wire of the coil and to provide a connection spot for the lead wire of the coil.

Advantageous Effects

The motor for driving the lenses according to embodiments of the present invention can minimize the size thereof while stably supplying current to the coil.

DETAILED DESCRIPTION

Hereinafter, embodiments of the present invention will be described with reference to accompanying drawings.

Figure 1:
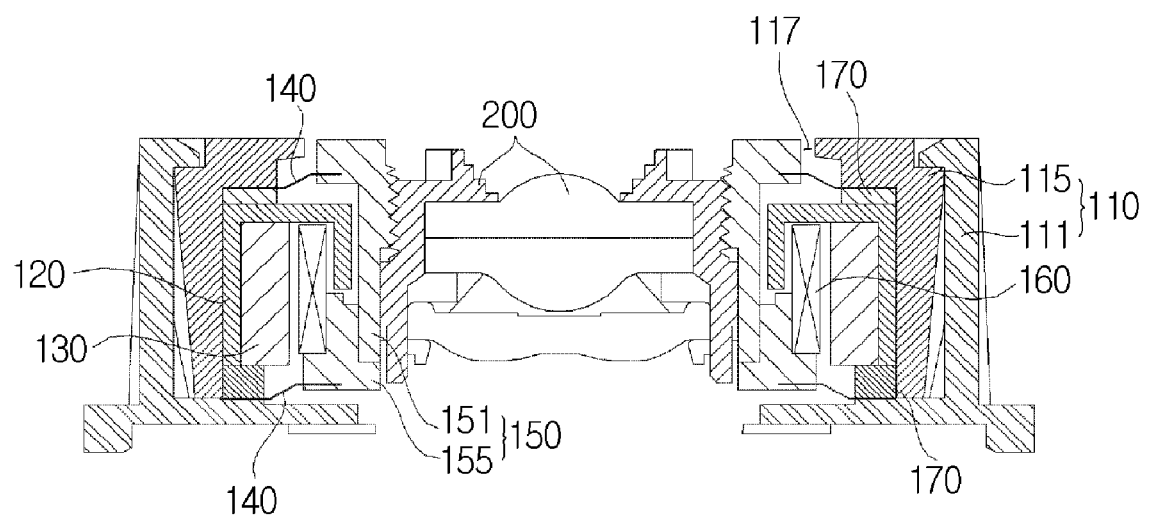
FIG. 1 is a sectional view showing a motor for driving lenses according to an embodiment of the present invention.

FIG. 1 is a sectional view showing a motor for driving lenses according to an embodiment of the present invention.

The motor for driving the lenses according to the embodiment of the present invention includes a case 110 having a predetermined space therein. The case 110 has a base 111 and an upper cover 115, which are coupled to each other. The upper cover 115 is formed at an upper surface thereof with an inlet hole 117, which is a path for a carrier 150.

A yoke 120 is fixed to an inner peripheral surface of the case 110, and a magnet 130 is fixed to an inner peripheral surface of the yoke 120. The yoke 120 and the magnet 130 may have ring shapes. The carrier 150 is installed in the magnet 130 while being supported by a spring 140 such that the carrier 150 can move up and down. Lenses 200 is installed in the carrier 150 in such a manner that the lenses 200 can move up and down according to the movement of the carrier 150. In order to facilitate assembly work, the carrier 150 consists of an upper carrier 151 and a lower carrier 155 which are coupled to each other.

A coil 160 is fixedly wound around an outer peripheral surface of the carrier 150. The coil 160 is spaced apart from the magnet 130 in opposition to the magnet 130. As current is applied to the coil 160, electromagnetic force is generated between the coil 160 and the magnet 130, so that the coil 160 is urged upward or downward. Thus, the carrier 150 is moved up or down, thereby moving the lenses 200.

A spacer 170 having elasticity is installed between a bottom surface of the yoke 120 and the base 111, and between a top surface of the yoke 120 and the upper cover 115, respectively. The spacer 170 may have a ring shape. The spacer 170 can be compressed and expanded so as to compensate for the tolerance of parts assembled in the case 110 and the tolerance occurring when assembling the parts.

The carrier 150, which has been moved up by the electromagnetic force, returns to its initial position by means of the spring 140. In addition, a lead wire of the coil 160 is connected to the spring 140 so that external power can be applied to the coil 160 through the spring 140. Two springs 140 are provided at upper and lower end portions of the outer peripheral surface of the carrier 150. That is, two springs 140 are fixed to the upper end portion of the outer peripheral surface of the upper carrier 151 and the lower end portion of the outer peripheral surface of the lower carrier 155, respectively. Thus, the up/down movement of the carrier 150 can be performed without being twisted. The lead wire of the coil 160 is soldered to one of the two springs 140.

The spring 140 not only returns the carrier 150 to the initial position, but also applies the current to the coil 160. In order to allow the external power to be applied to the coil 160 through the spring 140, the spring 140 is connected to the main PCB of the product.

Figure 2:
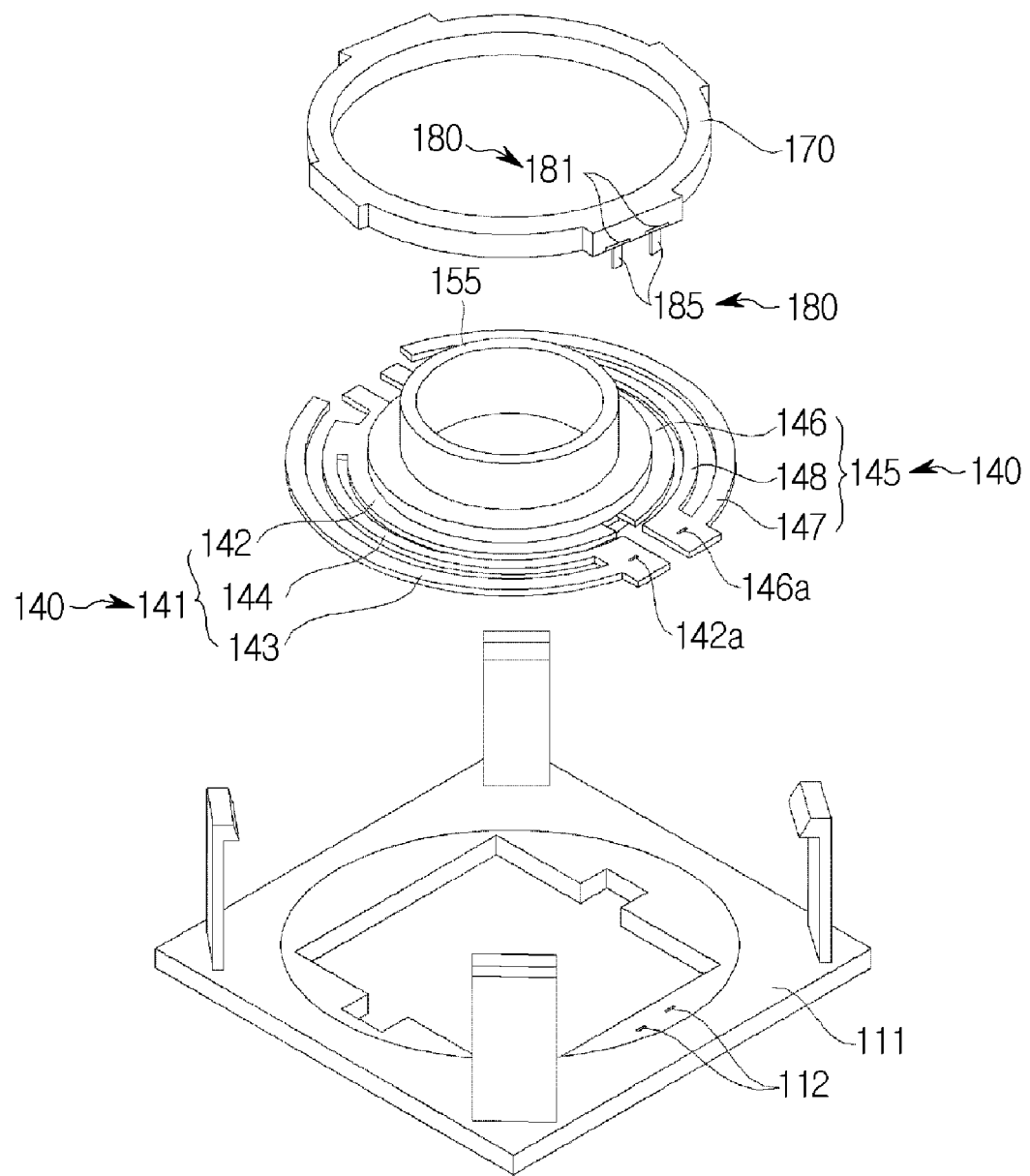
FIG. 2 is an exploded perspective view showing main components of a motor for driving lenses according to an embodiment of the present invention.
Figure 3:
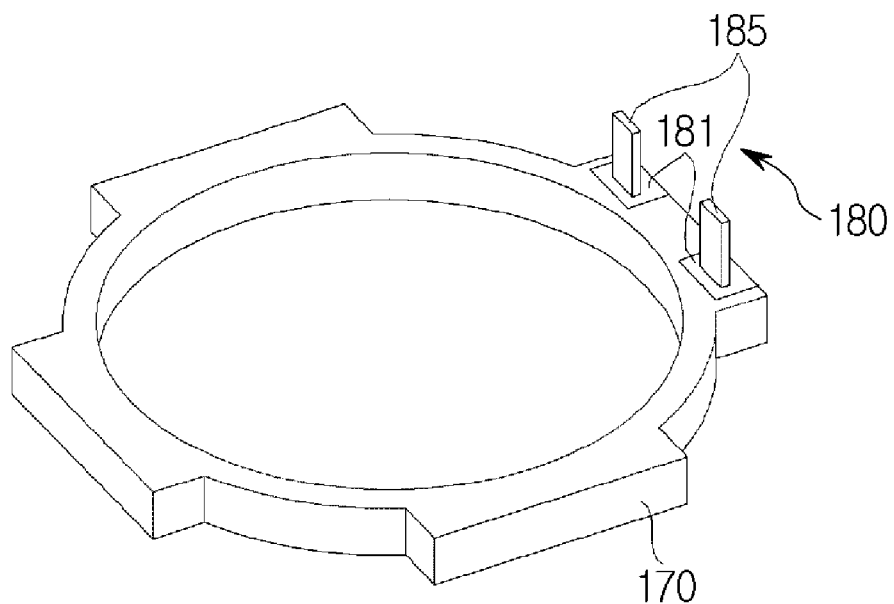
FIG. 3 is a perspective view showing a bottom of a spacer shown in FIG. 2.
Figure 4:
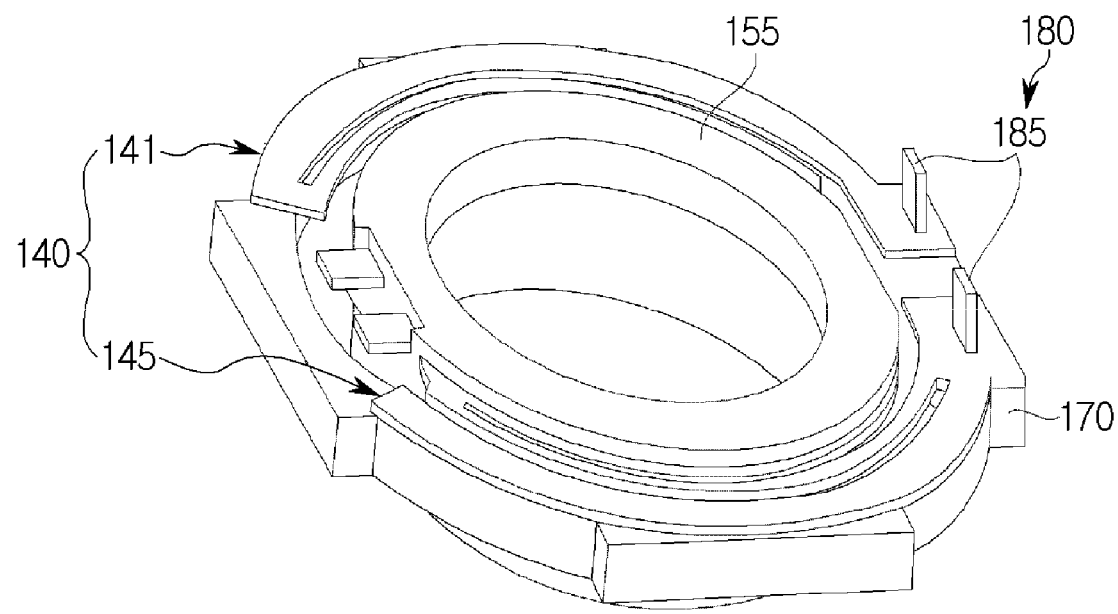
FIG. 4 is a perspective view showing a bottom of a spacer coupled with a carrier shown in FIG. 2.

In the motor for driving the lenses according to an embodiment of the present invention, the spring 140 is connected to the main PCB by means of a terminal in order to minimize the size of the motor. Hereinafter, embodiments of the present invention will be described with reference to drawings 2 to 4. FIG. 2 is an exploded perspective view showing main components of the motor for driving the lenses according to an embodiment of the present invention, FIG. 3 is a perspective view showing a bottom of the spacer shown in FIG. 2, and FIG. 4 is a perspective view showing the bottom of the spacer coupled with the carrier shown in FIG. 2.

As shown in the drawings, the spring 140 includes first and second springs 141 and 145 having arc shapes and being separated from each other. The first and second springs 141 and 145 form a ring shape as a whole.

The first and second springs 141 and 145 include inner sections 142 and 146, outer sections 143 and 147, and connection sections 144 and 148. The inner sections 142 and 146 have arc shapes, and inner peripheral surfaces thereof can be integrally formed with an outer surface of the lower carrier 155 through a molding process. The outer sections 143 and 147 have arc shapes and outer peripheral surfaces thereof are fixed between the spacer 170 and the base 111. The connection sections 144 and 148 connect the inner sections 142 and 146 to the outer sections 143 and 147.

As external power is supplied to the coil 160 through the spring 140, the coil 160 moves up due to the electromagnetic force, so that the carrier 150 and the lenses 200 also move up. Thus, the inner sections 142 and 146 of the spring 140 move up according to the movement of the carrier 150. Then, if the current being supplied to the coil 160 is shut off, the carrier 150 moves down to its initial position by means of elasticity of the spring 140.

One end portion and the other end portion of the inner sections 142 and 146 of the spring 140 are exposed out of the carrier 150 so as to connected with the lead wire of the coil 160 and conductive terminals 180, respectively.

A pair of conductive terminals 180 are provided, and the conductive terminals 180 are prepared by using metallic materials. Each conductive terminal 180 includes a body 181 and a connection pin 185. The body 181 is provided on a predetermined region of the spacer 170, which is opposed to the other end portions of the inner sections 142 and 146. The connection pin 185 extends from the body 181 and protrudes downward by passing through the base 111 of the case 110 so as to be connected with the main PCB.

Since the connection pins 185 are connected with the main PCB by passing through the bottom of the case 110 without protruding out of the case 110, the motor for driving the lenses according to the embodiment of the present invention can be minimized.

Support holes 142a and 146a are formed at the other end portions of the inner sections 142 and 146 and the connection pins 185 pass through the support holes 142a and 146a. In addition, the base 111 is formed with support holes 112 into which the connection pins 185 are inserted.

The connection pins 185 of the terminals 180 fixed to the spacer 170 are connected to the main PCB by passing through the support holes 142a and 146a of the inner sections 142 and 146. Accordingly, the spring 140 is connected to the connection pins 185 while being supported by the connection pins 185, so that the spring 140 is inhibited from horizontally moving.

In addition, since the connection pins 185 are inserted into the support holes 112 of the base 111, the connection pins 185 are supported by the base 111, so that the connection pins 185 can be inhibited from moving.

In order to securely fix the terminal 180 to the spring 140, the body 181 can be welded to other end portions of the inner sections 142 and 146 of the spring 140.

Figure 5:
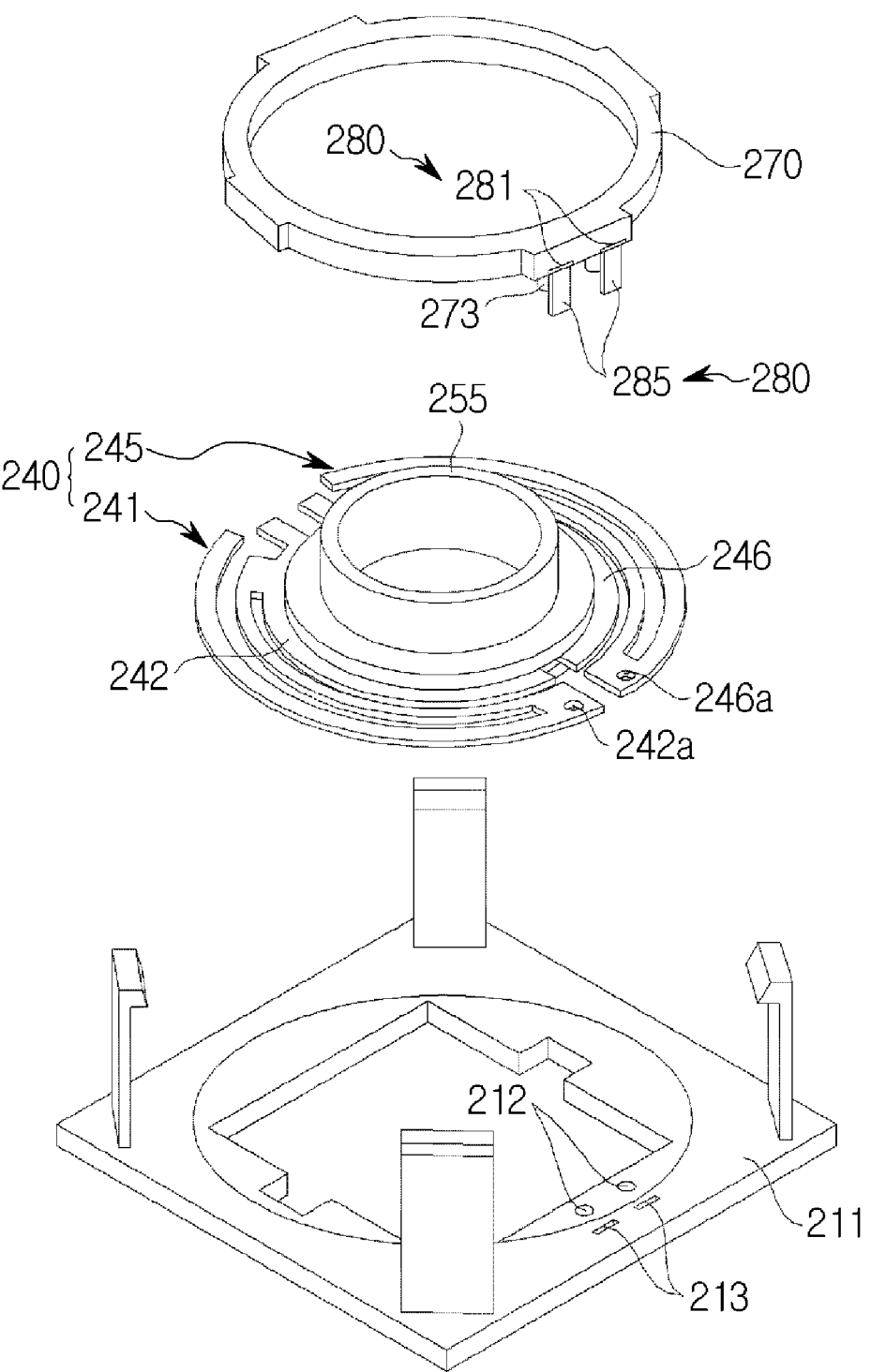
FIG. 5 is an exploded perspective view showing main components of a motor for driving lenses according to an embodiment of the present invention.
Figure 6:
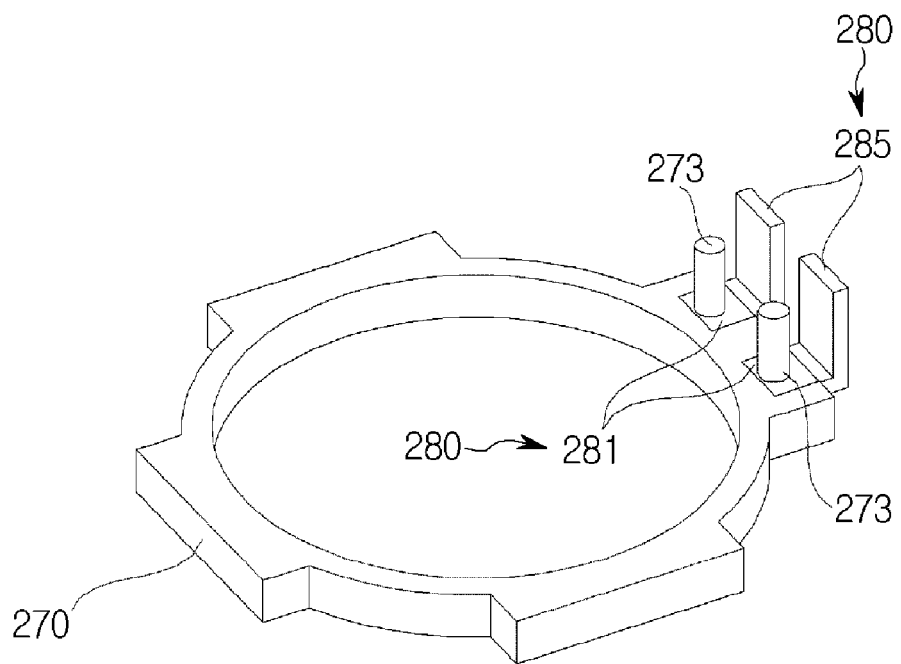
FIG. 6 is a perspective view showing a bottom of a spacer shown in FIG. 5.
Figure 7:
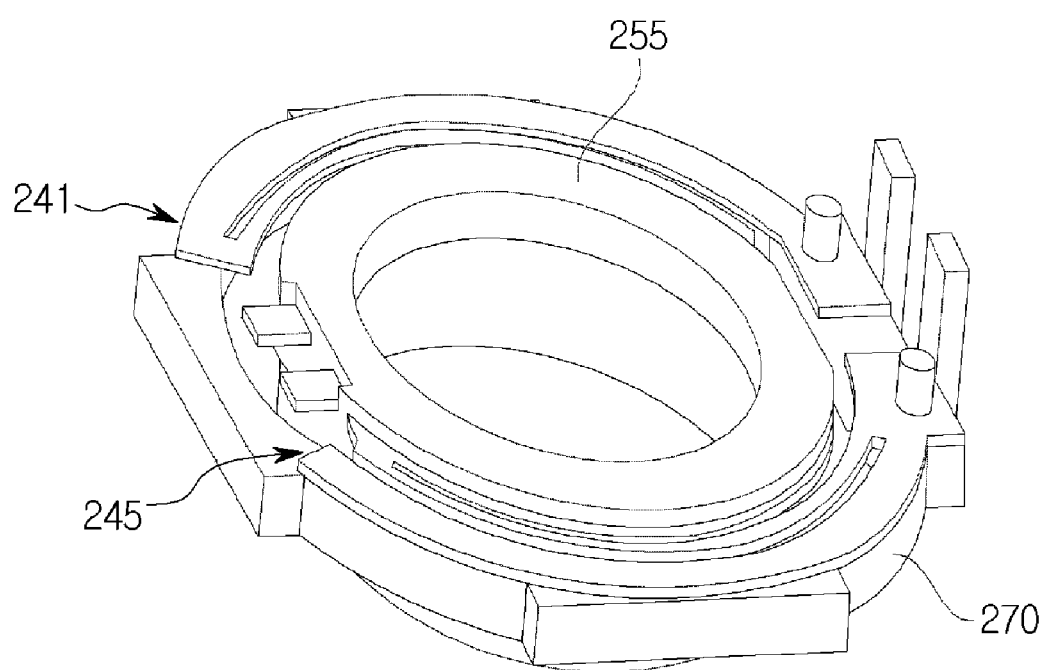
FIG. 7 is a perspective view showing a bottom of a spacer coupled with a carrier shown in FIG. 5.

Hereinafter, a motor for driving lenses according to another embodiment of the present invention will be described with reference to FIGS. 5 to 7. FIG. 5 is an exploded perspective view showing main components of the motor for driving the lenses according to another embodiment of the present invention, FIG. 6 is a perspective view showing a bottom of a spacer shown in FIG. 5, and FIG. 7 is a perspective view showing the bottom of the spacer coupled with the carrier shown in FIG. 5. The following description for the present embodiment will be focused on the difference relative to the embodiment described with reference to FIGS. 2 to 4.

As shown in the drawings, one end portion and the other end portion of inner sections of first and second springs 241 and 245 are exposed out of a lower carrier 255, and the lead wire of the coil is connected to the one end portion of the inner sections 242 and 246.

Support protrusions 273 are provided at a predetermined region of a spacer 270 opposed to the other end portions of the inner sections 242 and 246. Support holes 242a and 246a are formed at the other end portion of the inner sections 242 and 246 of the spring 240 and the support protrusions 273 pass through the support holes 242a and 246a. In addition, support holes 212 are formed at the base 211 and the support protrusions 273 are inserted into the support holes 212 of the base 211.

Since the support protrusions 273 pass through the support holes 242a and 246a, the spring 240 is supported by the support protrusions 273, so that the spring 240 is inhibited from horizontally moving. In addition, since the support protrusions 273 are inserted into the support holes 212 of the base 211, the spacer 270 is supported by the base 211, so that the spacer 270 can be inhibited from moving.

Each terminal 280 includes a body 281 and a connection pin 285. The body 281 is provided in the vicinity of the support protrusion 273. The body 281 is welded to other end portions of inner sections 242 and 246 of the first and second springs 241 and 245. The connection pin 285 extends from the body 281 and is inserted into the support hole 213 formed in the base 211, so that the connection pin 285 is connected to the main PCB. Since the connection pin 285 is inserted into the support hole 213, the terminal 280 is fixedly supported by the base 211.

As described above, according to the motor for driving the lenses of the embodiment of the present invention, the body of the terminal is provided in the spacer and makes connection with the spring so as to connect the spring to the main PCB of the product. In addition, the connection pin of the terminal extends downward by passing through the base of the case so as to be connected to the main PCB of the product. That is, in the motor for driving the lenses according to the embodiment of the present invention, the terminal is not exposed out of the case, so that the size of the motor can be minimized.

Figure 8:
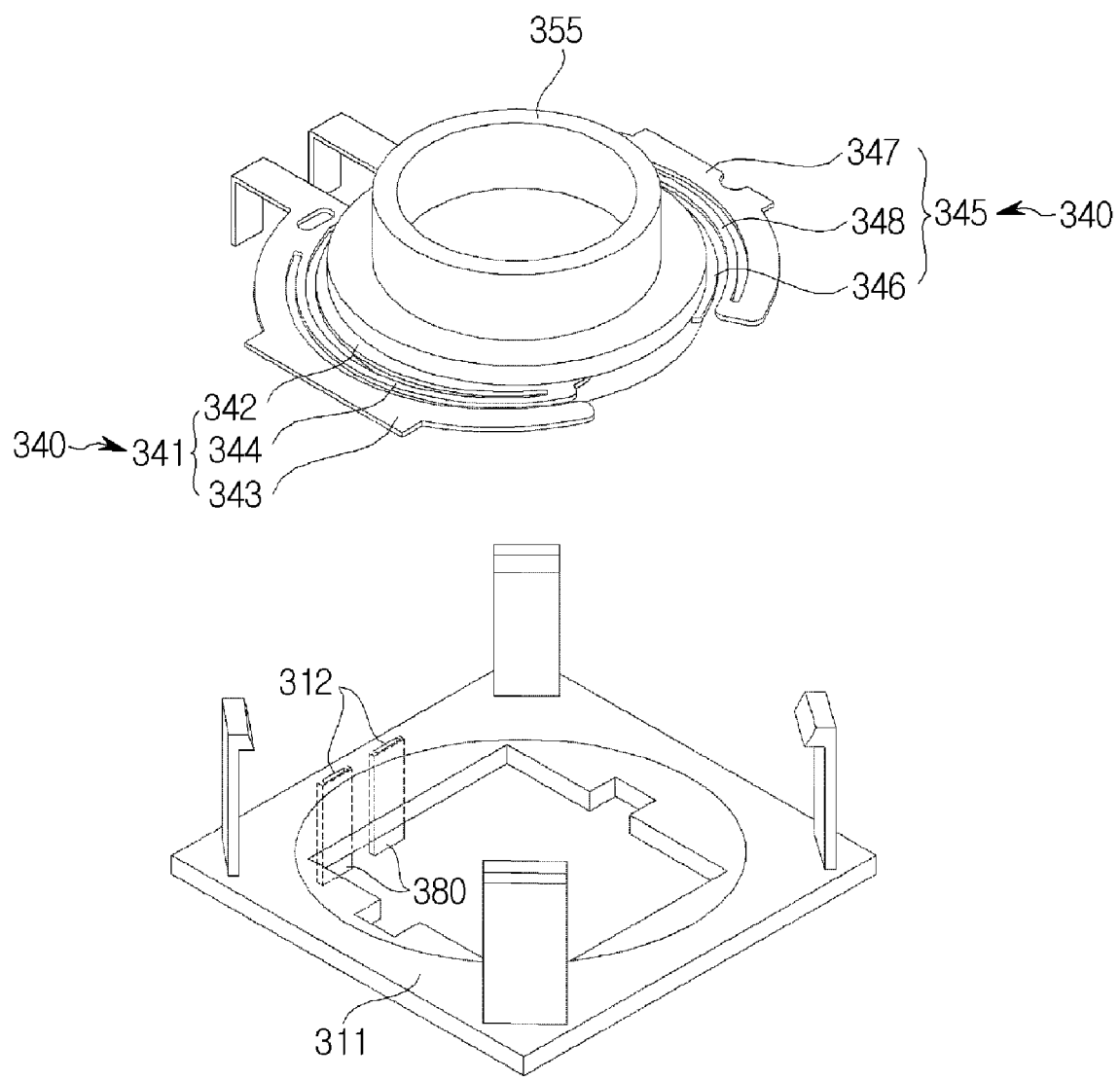
FIG. 8 is an exploded perspective view showing main components of a motor for driving lenses according to an embodiment of the present invention.
Figure 9:
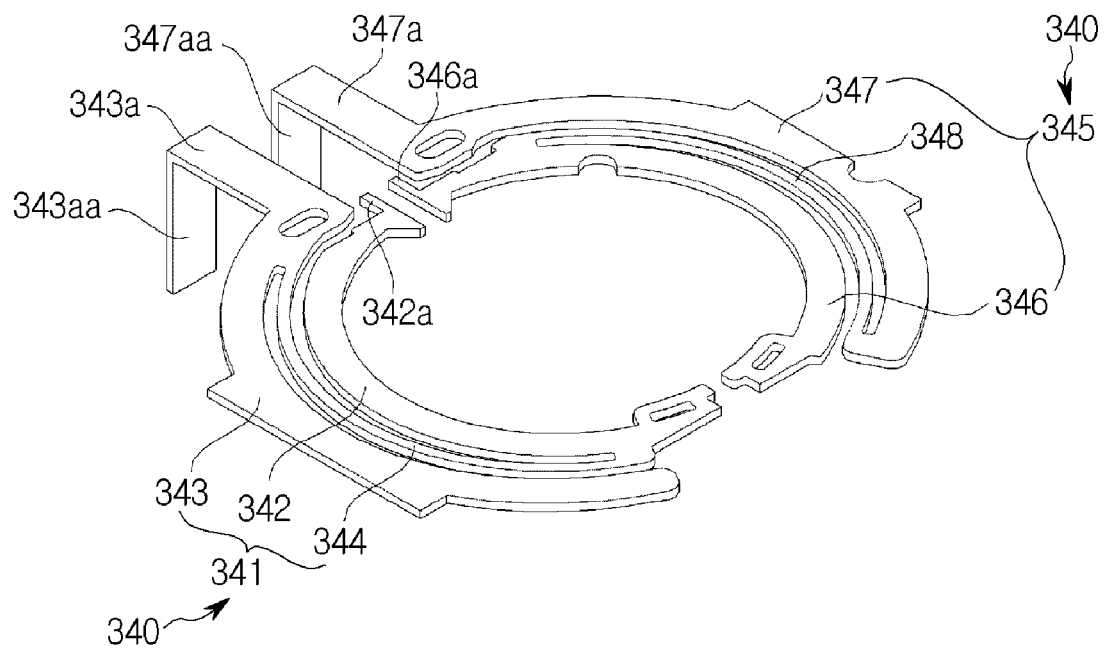
FIG. 9 is a perspective view showing an example of a spring shown in FIG. 8.

Hereinafter, a motor for driving lenses according to still another embodiment of the present invention will be described with reference to FIGS. 8 and 9. FIG. 8 is an exploded perspective view showing main components of the motor for driving the lenses according to the still another embodiment of the present invention, and FIG. 9 is a perspective view showing an example of a spring shown in FIG. 8.

As shown in the drawings, the spring 340 includes first and second springs 341 and 345 having arc shapes and being separated from each other. The first and second springs 341 and 345 form a ring shape as a whole.

The first and second springs 341 and 345 include inner sections 342 and 346, outer sections 343 and 347, and connection sections 344 and 348. The inner sections 342 and 346 have arc shapes, and inner peripheral surfaces thereof can be integrally formed with an outer surface of the lower carrier 355 through a molding process. The outer sections 343 and 347 have arc shapes and outer peripheral surfaces thereof are fixed between a spacer and a base 311. The connection sections 344 and 348 connect the inner sections 342 and 346 to the outer sections 343 and 347. First end portions 342a and 346a of the inner sections 342 and 346 are exposed out of the lower carrier 355 such that the lead wire of the coil can be soldered to the first end portions 342a and 346a.

As external power is supplied to the coil through the spring 340, the coil moves up due to the electromagnetic force, so that the carrier and the lenses also move up. Thus, the inner sections 342 and 346 of the spring 340 move up according to the movement of the carrier. Then, if the current being supplied to the coil is shut off, the carrier moves down to its initial position by means of elasticity of the spring 340.

In addition, first end portions 343a and 347a of the outer sections 343 and 347 are exposed out of the lower carrier 355. Lower bending sections 343aa and 347aa are inserted into support holes 312 formed in the base 311 and are soldered to the main PCB of the product. That is, the bending sections 343aa and 347aa of the spring 340 connected to the main PCB of the product are not exposed to the exterior of the case, but exposed by passing through the bottom of the base 311, so that the size of the motor for driving the lenses can be minimized.

In addition, since the bending sections 343aa and 347aa of the spring 340 are fixedly supported by the support holes 312 formed in the base 311, the spring 340 is inhibited from moving.

Terminals 380 are integrally formed in the support holes 312 and protrude downward to make connection with the main PCB of the product by means of soldering. At this time, the bending sections 343aa and 347aa of the spring 340 are inserted into the support holes 312 to make contact with the terminals 380.

Figure 10:
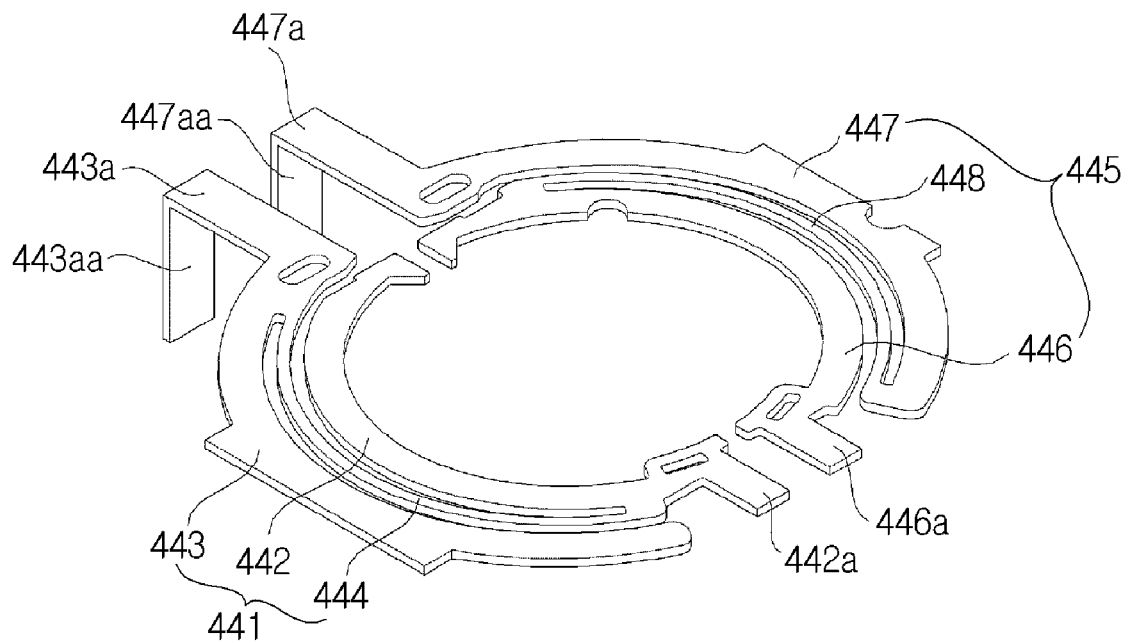
FIG. 10 is a perspective view showing an example of a spring shown in FIG. 8.

FIG. 10 is a perspective view showing another example of a spring shown in FIG. 8. Hereinafter, the spring shown in FIG. 10 will be described while focusing on the difference relative to the spring described with reference to FIGS. 8 and 9. The base, the support holes, the lower carrier and the terminals may have reference numerals the same as those of the embodiment described with reference to FIG. 8.

The first and second springs 441 and 445 include inner sections 442 and 446, outer sections 443 and 447, and connection sections 444 and 448. The inner sections 442 and 446 have arc shapes, and inner peripheral surfaces thereof can be integrally formed with an outer surface of the lower carrier 355 through a molding process. The outer sections 443 and 447 have arc shapes and outer peripheral surfaces thereof are fixed between the spacer and the base 311. The connection sections 444 and 448 connect the inner sections 442 and 446 to the outer sections 443 and 447.

First end portions 443a and 447a of the outer sections 443 and 447 of the first and second springs 441 and 445 are exposed out of the lower carrier 355. Bending sections 443aa and 447aa, which are bent downward, are connected to the main PCB. Second end portions 442a and 446a of the inner sections 442 and 446, which correspond to the other end portions of the bending sections 443aa and 447aa, are exposed to the exterior of the lower carrier 355 so as to be connected with the lead wire of the coil.

In addition, the bending sections 443aa and 447aa can be inserted into the support holes 312 so as to be connected to the terminals 380 making contact with the main PCB of the product.

Figure 11:
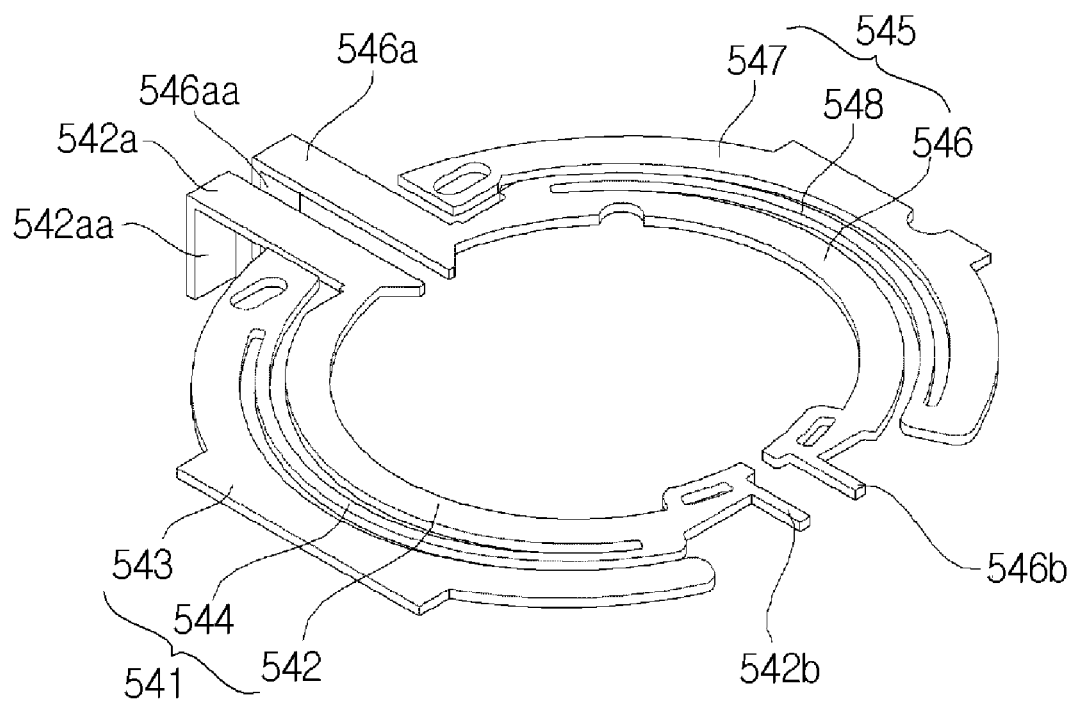
FIG. 11 is a perspective view showing an example of a spring shown in FIG. 8.

FIG. 11 is a perspective view showing another example of a spring shown in FIG. 8. Hereinafter, the spring shown in FIG. 11 will be described while focusing on the difference relative to the spring described with reference to FIGS. 8 and 9. The base, the support holes, the lower carrier and the terminals may have reference numerals the same as those of the embodiment described with reference to FIG. 8.

As shown in FIG. 11, the first and second springs 541 and 545 include inner sections 542 and 546, outer sections 543 and 547, and connection sections 544 and 548. The inner sections 542 and 546 have arc shapes, and inner peripheral surfaces thereof can be integrally formed with an outer surface of the lower carrier 355 through a molding process. The outer sections 543 and 547 have arc shapes and outer peripheral surfaces thereof are fixed between the spacer and the base 311. The connection sections 544 and 548 connect the inner sections 542 and 546 to the outer sections 543 and 547.

First end portions 542a and 546a of the inner sections 542 and 546 of the first and second springs 541 and 545 are exposed out of the lower carrier 355. Lower bending sections 542aa and 546aa are connected to the main PCB. Second end portions 542b and 546b of the inner sections 542 and 546, which correspond to the other end portions of the bending sections 542aa and 546aa, are exposed to the exterior of the lower carrier 355 so as to be connected with the lead wire of the coil.

In addition, the bending sections 542aa and 546aa can be inserted into the support holes 312 so as to be connected to the terminals 380 making contact with the main PCB of the product.

Figure 12:
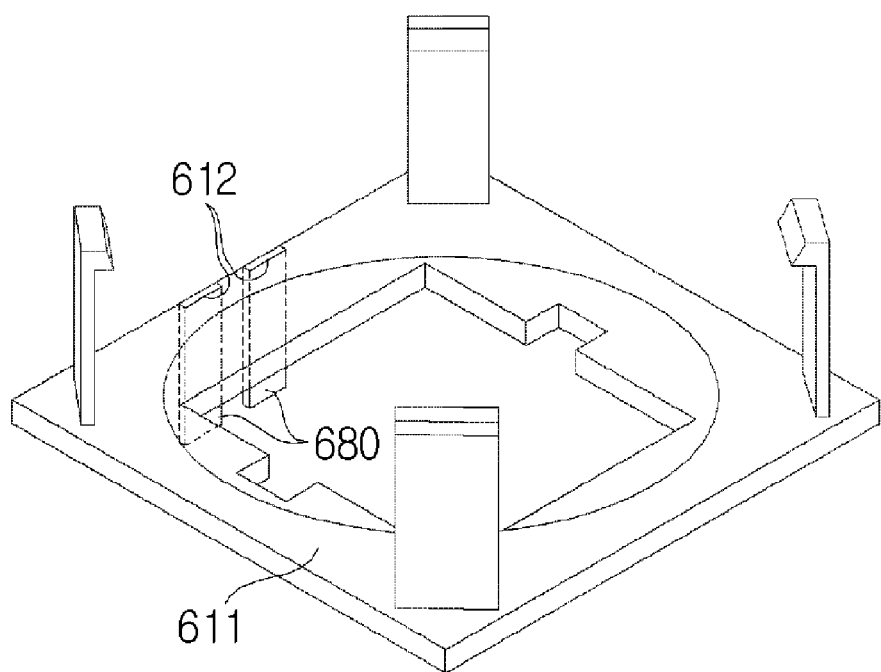
FIG. 12 is a perspective view showing a base according to an embodiment of the present invention.

FIG. 12 is a perspective view showing a base according to another embodiment of the present invention. Hereinafter, the base shown in FIG. 12 will be described while focusing on the difference relative to the base shown in FIG. 8.

As shown in FIG. 12, support slots 612 are formed at one side of the base 611. Terminals 680 connected to the main PCB are press-fitted into the support slots 612. In addition, the bending sections 343aa and 347aa, 443aa and 447aa, or 542aa and 546aa, which are described with reference to FIGS. 9 to 11, can be soldered to the outer surface of the terminals 680 exposed out of the base 611.

If there are no terminals 680, the bending sections 343aa and 347aa, 443aa and 447aa, or 542aa and 546aa can be directly connected to the main PCB.

As described above, according to the motor for driving the lenses of the embodiments of the present invention, one side of the spring connected to the lead wire of the coil is bent and the bending portion of the spring is exposed by passing through the bottom of the base of the case, so that the bending portion of the spring can be connected to the main PCB of the product. In addition, according to the motor for driving the lenses of the embodiments of the present invention, the bending portion of the spring can be connected to the terminal provided at the lower portion of the base of the case in such a manner that the spring can be connected to the main PCB of the product. Thus, the portion connected to the main PCB of the product is not exposed out of the case, so that the size of the motor according to the present invention can be minimized. In addition, since metallic bending portion of the spring or the metallic terminal can be directly connected to the main PCB of the product through soldering or the like, deformation is inhibited and workability is improved.

Figure 13:
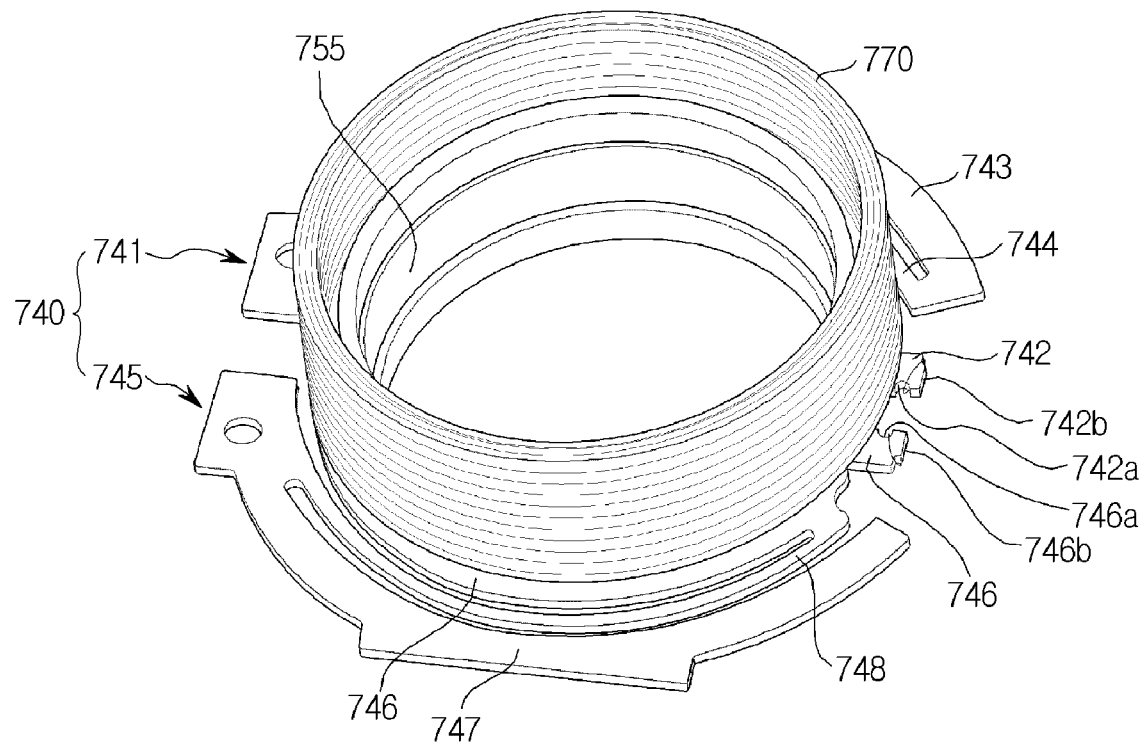
FIG. 13 is a perspective view showing a connection structure between a coil and a spring according to an embodiment of the present invention.

FIG. 13 is a perspective view showing a connection structure between a coil and a spring according to another embodiment of the present invention.

The spring 740 includes first and second springs 741 and 745 having arc shapes and being separated from each other. The first and second springs 741 and 745 form a ring shape as a whole.

The first and second springs 741 and 745 include inner sections 742 and 746, outer sections 743 and 747, and connection sections 744 and 748. The inner sections 742 and 746 have arc shapes, and inner peripheral surfaces thereof can be integrally formed with an outer surface of the lower carrier 755 through a molding process. The outer sections 743 and 747 have arc shapes and outer peripheral surfaces thereof are fixed between a spacer and a base. The connection sections 744 and 748 connect the inner sections 742 and 746 to the outer sections 743 and 747. First end portions of the inner sections 742 and 746 are exposed to the exterior such that the lead wire of the coil can be soldered to the first end portions.

As external power is supplied to the coil 770 through the spring 740, the coil 770 moves up due to the electromagnetic force, so that the carrier and the lenses also move up. Thus, the inner sections 742 and 746 of the spring 740 move up together with the carrier. Then, if the current being supplied to the coil 770 is shut off, the carrier moves down to its initial position by means of elasticity of the spring 740. In addition, the spring 740 is soldered to the lead wire of the coil so as to supply the external power to the coil 770.

The spring 740 of the motor for driving the lenses according to the embodiment of the present invention is provided with a connection member, which supports the lead wire of the coil 770 and which provides a connection spot for the lead wire of the coil 770.

The connection member includes insertion grooves 742a and 746a, which are formed at the first side of one end of the spring 740, and locking protrusions 742b and 746b, which are provided at the second side of one end of the spring 740. The lead wire of the coil 770 is inserted into the insertion grooves 742a and 746a. In addition, the lead wire of the coil 770 is coupled with the locking protrusions 742b and 746b.

In order to solder the lead wire of the coil 770 to the first end portions of the inner sections 742 and 746, the lead wire of the coil 770 must be wound around the first end portions of the inner sections 742 and 746. According to the motor for driving the lenses of an embodiment of the present invention, the lead wire of the coil 770 is wound around the inner sections 742 and 746 while being inserted into the insertion grooves 742a and 746a and locked with the locking protrusions 742b and 746b. Therefore, the lead wire of the coil 770 can be securely supported and precisely wound around predetermined parts of the inner sections 742 and 746. Thus, the lead wire of the coil 770 can be securely soldered to the predetermined parts of the inner sections 742 and 746.

Figure 14:
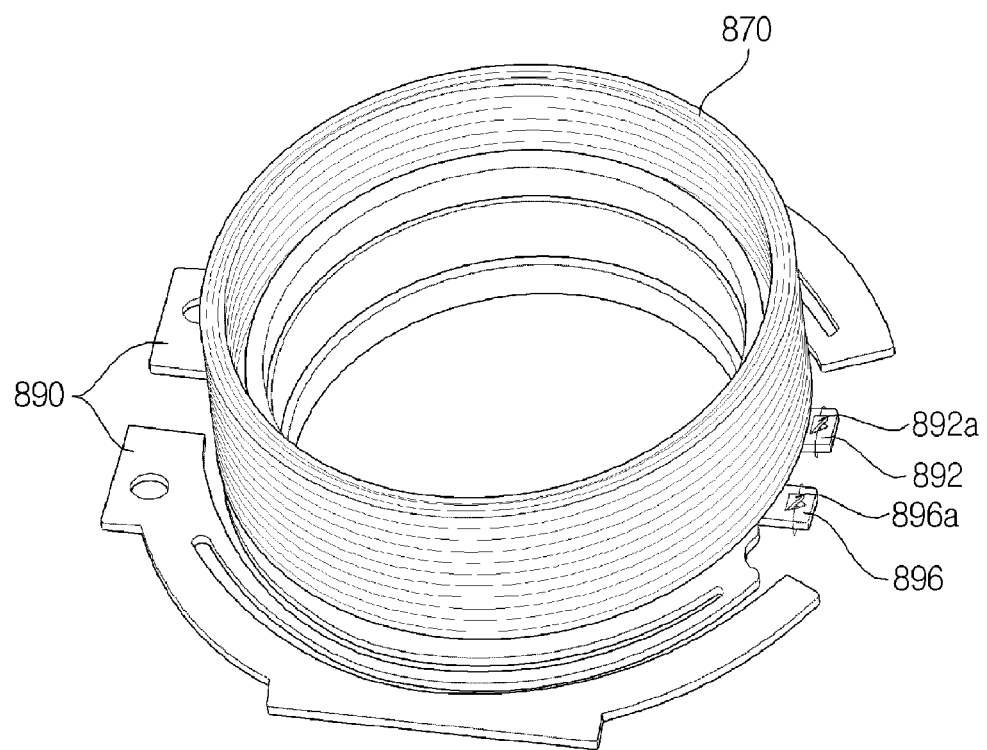
FIG. 14 is a perspective view showing a connection structure between a coil and a spring according to an embodiment of the present invention.

FIG. 14 is a perspective view showing a connection structure between a coil and a spring according to still another embodiment of the present invention. Hereinafter, the connection structure shown in FIG. 14 will be described while focusing on the difference relative to the connection structure shown in FIG. 13.

According to the motor for driving the lenses of the present embodiment, a spring 890 is provided with a connection member, which supports a lead wire of a coil 870 and which provides a connection spot for the lead wire of the coil 870.

The connection member is provided at first end portions of inner sections 892 and 896 of the spring 890 and includes support protrusions 892a and 896a for receiving and supporting the lead wire of the coil 870. The support protrusions 892a and 896a can be formed by cutting predetermined portions of the inner sections 892 and 896 and then bending the predetermined portions of the inner sections 892 and 896 by a predetermined angle. When the lead wire of the coil 870 is wound around the inner sections 892 and 896, the lead wire of the coil 870 is coupled with end portions of the support protrusions 892a and 896a integrally formed with the inner sections 892 and 896. Accordingly, the lead wire of the coil 870 can be inhibited from being separated from the inner sections 892 and 896.

As described above, according to the motor for driving the lenses of the embodiments of the present invention, the lead wire of the coil is securely supported on the support protrusions provided at the predetermined portions of the spring to which the lead wire is soldered. Therefore, the soldering fault may not occur, and the lead wire can be precisely soldered to the predetermined portions of the spring, improving reliability of the product.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The motor for driving the lenses according to embodiments of the present invention can minimize the size thereof while stably supplying current to the coil.

The invention claimed is:

1. A motor for driving a lens, the motor comprising:
   a base comprising a first side surface, a second side surface opposite the first side surface, a first through hole, and a second through hole, wherein the first and second through holes are provided closer to the first side surface than to the second side surface;

a yoke disposed on the base, the yoke comprising a side surface and an upper surface formed with a hole;
a carrier disposed in the yoke;
a coil disposed on an outer peripheral surface of the carrier and comprising a first end portion and a second end portion;
a magnet facing the coil and disposed in the yoke;
an upper spring coupled to an upper portion of the carrier; and
a lower spring coupled to a lower portion of the carrier, and comprising a first lower spring and a second lower spring physically separated from the first lower spring,
wherein the first end portion of the coil is coupled to the first lower spring, and the second end portion of the coil is coupled to the second lower spring,
wherein each of the first and second lower springs comprises an inner section coupled to the carrier, an outer section spaced apart from the inner section, a connection section connecting the inner section to the outer section, and a bending section connected to the outer section and bent downward,
wherein each of the bending sections of the first and second lower springs is disposed in the first through hole and the second through hole, respectively, and
wherein each of the bending sections of the first and second lower springs comprises a first portion that is not exposed out of the first side surface of the base.

2. The motor according to claim 1, wherein each of the bending sections of the first and second lower springs comprises a second portion that is exposed out of a lower surface of the base by the first and second through holes, respectively.

3. The motor according to claim 1, wherein the base comprises an upper surface and a lower surface, and
wherein the first and second through holes are formed in a direction from the lower surface to the upper surface.

4. The motor according to claim 1, wherein each of the inner sections of the first and second lower springs is exposed out of the carrier such that the first and second end portions of the coil are connected to each of the inner sections of the first and second lower springs, respectively.

5. The motor according to claim 1, wherein each of the bending sections of the first and second lower springs does not protrude, in a direction perpendicular to an optical axis, beyond an outermost portion of the first side surface of the base.

6. The motor according to claim 1, wherein each of the bending sections of the first and second lower springs is configured to be electrically connected to a PCB of an external electrical device.

7. The motor according to claim 1, wherein each of the outer sections of the first and second lower springs is disposed between a lower surface of the magnet and an upper surface of the base.

8. A camera comprising:
a lens; and
the motor according to claim 1 and configured to drive the lens.

9. A motor for driving a lens, the motor comprising:
a base comprising a first through hole and a second through hole, the first and second through holes provided adjacent at a first side surface of the base;
a yoke disposed on the base, the yoke comprising a side surface and an upper surface formed with a hole;
a carrier disposed in the yoke;
a coil disposed on an outer peripheral surface of the carrier and comprising a first end portion and a second end portion;
a magnet facing the coil, the coil configured to interact with the magnet such that the carrier moves up and down in an optical axis direction;
an upper spring coupled to an upper portion of the carrier; and
a lower spring coupled to a lower portion of the carrier, and comprising a first lower spring and a second lower spring physically separated from the first lower spring,
wherein the first end portion of the coil is coupled to the first lower spring, and the second end portion of the coil is coupled to the second lower spring,
wherein each of the first and second lower springs comprises an inner section coupled to the carrier, an outer section spaced apart from the inner section, a connection section connecting the inner section to the outer section, and a bending section connected to the outer section and bent downward,
wherein each of the bending sections of the first and second lower springs is disposed in the first and second through holes, respectively, and
wherein the first and second through holes pass through the base from an upper surface thereof to a lower surface thereof and are provided on the upper surface of the base in an area that is further inward than the first side surface of the base when viewed from above the base in the optical axis direction.

10. The motor according to claim 9, wherein the first end portion of the coil is coupled to an upper portion of the inner section of the first lower spring, and
wherein the second end portion of the coil is coupled to an upper portion of the inner section of the second lower spring.

11. The motor according to claim 9, wherein the outer section of the first lower spring and the outer section of the second lower spring are disposed on the upper surface of the base and are between a lower surface of the magnet and the upper surface of the base in the optical axis direction.

12. The motor according to claim 9, wherein each of the bending sections of the first and second lower springs protrudes downwards beneath a portion of the base.

13. The motor according to claim 9, wherein the first through hole and the second through hole are provided between the first side surface of the base and the outer peripheral surface of the carrier.

14. The motor according to claim 9, wherein each of the bending sections of the first and second lower springs is configured to be electrically connected to a PCB of an external electrical device.

15. A camera comprising:
a lens; and
the motor according to claim 9 and configured to drive the lens.

16. A motor for driving a lens, the motor comprising:
a base comprising a first through hole and a second through hole, the first and second through holes provided adjacent at a first side surface of the base;
a yoke disposed on the base, the yoke comprising a side surface and an upper surface formed with a hole;
a carrier disposed in the yoke;
a coil disposed on an outer peripheral surface of the carrier and comprising a first end portion and a second end portion;

a magnet facing the coil and disposed in the yoke, the coil configured to interact with the magnet such that the carrier moves up and down in an optical axis direction;

an upper spring coupled to an upper portion of the carrier; and a lower spring coupled to a lower portion of the carrier, and comprising a first lower spring and a second lower spring physically separated from the first lower spring, wherein the first end portion of the coil is coupled to the first lower spring, and the second end portion of the coil is coupled to the second lower spring, wherein each of the first and second lower springs comprises an inner section coupled to the carrier, an outer section spaced apart from the inner section, a connection section connecting the inner section to the outer section, and a bending section connected to the outer section and bent downward, wherein each of the bending sections of the first and second lower springs is disposed in the first and second through holes, respectively, wherein each of the bending sections of the first and second lower springs comprises a first portion that is not exposed out of the first side surface of the base, and wherein the first and second through holes pass through the base from an upper surface thereof to a lower surface thereof and are provided on the upper surface of the base in an area that is further inward than the first side surface of the base when viewed from above the base in the optical axis direction.

17. The motor according to claim 16, wherein each of the bending sections of the first and second lower springs is exposed out of a lower surface of the base by passing through the first and second through holes, respectively.

18. The motor according to claim 16, wherein each of the inner sections of the first and second lower springs is exposed out of the carrier such that the first and second end portions of the coil are connected to each of the inner sections of the first and second lower springs, respectively, and wherein each of the bending sections of the first and second lower springs is configured to be electrically connected to a PCB of an external electrical device.

19. The motor according to claim 16, wherein the first through hole and the second through hole are provided between the first side surface of the base and the outer peripheral surface of the carrier.

20. A camera comprising:

a lens; and the motor according to claim 16 and configured to drive the lens.

* * * * *